United States Patent [19]

Ohara et al.

[11] 3,900,440

[45] Aug. 19, 1975

[54] ADHESIVE COMPOSITION

[75] Inventors: Osamu Ohara; Nobuyoshi Wakabayashi, both of Kurashiki, Japan

[73] Assignee: Kuraray Co., Ltd., Kurashiki, Japan

[22] Filed: Oct. 23, 1973

[21] Appl. No.: 408,882

[30] Foreign Application Priority Data
Nov. 2, 1972    Japan.............................. 47-110048

[52] U.S. Cl. .................... 260/29.7 W; 117/122 P; 117/122 PA; 260/29.6 H; 260/29.6 M; 260/29.6 NR; 260/29.7 UA; 260/29.7 M
[51] Int. Cl..... C08d 7/14; C08f 15/40; C08f 45/26; C08f 45/58
[58] Field of Search ........... 260/29.6 H, 29.6 M, 40, 260/41, 29.7 W, 29.6 NR:29.2, 29.7 UA:29.7 M; 117/122 PA:122 P

[56] References Cited
UNITED STATES PATENTS

| | | | |
|---|---|---|---|
| 3,238,170 | 1/1966 | Wolff et al. .................. | 260/29.6 M |
| 3,326,856 | 6/1967 | Barie et al. ..................... | 260/29.6 M |
| 3,449,194 | 6/1969 | Scheffler et al. ............... | 260/29.6 M |
| 3,646,044 | 2/1972 | Sekmakas ..................... | 260/29.6 H |
| 3,671,295 | 6/1972 | Ravve et al. ................... | 260/29.6 H |
| 3,740,336 | 6/1973 | Sanderson et al. ............ | 260/29.6 M |

FOREIGN PATENTS OR APPLICATIONS

963,380    7/1964    United Kingdom

OTHER PUBLICATIONS

Chem. Abs. 73:P88641(a); 69:P44425(w); 63:P16570(f); 61:P10843(c); 55:P12940 (b).

*Primary Examiner*—Melvin Goldstein
*Assistant Examiner*—T. De Benedictis, Sr.
*Attorney, Agent, or Firm*—Kaufman & Kramer

[57] ABSTRACT

An adhesive composition is provided comprising: (A) a member selected from the group consisting of (1) a copolymer of an olefin and a carboxylic acid and (2) a salt of said copolymer; and (B) a salt of a polyvalent metal and (C) a compound having at least two expoxy groups per molecule.

27 Claims, No Drawings

ADHESIVE COMPOSITION

This invention relates to an adhesive composition comprising a mixture of a carboxyl group-containing polymer, a polyvalent metal salt and a compound containing at least 2 epoxy groups in the molecule and to an adhesive composition comprising said mixture incorporated in an aqueous latex. The adhesive compositions of this invention are especially suitable for bonding woods.

Water-soluble precondensates formed by condensing formalin with one or more of urea, melamine and phenol have heretofore been widely used as wood adhesives. Adhesive compositions comprising a thermosetting resin have a high adhesive strength to woods and they provide an adhesive layer exhibiting water resistance when they are applied to woods and heated to cause the thermosetting reaction. Accordingly, they are mainly used in fields where water resistance is required and the kind of the thermosetting resin is selected depending on the desired degree of water resistance. These thermosetting resin-type adhesives have the following defects. The first defect is that they inevitably have a smell of formalin. A thermosetting resin of the formalin type contains a large amount of unreacted formalin, and since such unreacted formalin is freely released in air, the surrounding environment is adversely effected. Wood articles formed with use of such thermosetting adhesives, for instance, plywoods, release formalin during storage or use, and the adverse influences attributable to released formalin pose serious problems. The second defect is that the adhesive strength changes greatly with the passage of time; namely, aging is readily advanced in these thermosetting resin type adhesives. It is said that the adhesive strength is reduced to 90% in about 8 months. The third defect is that the initial adhesive strength is low and a long time is required in the initial clamping operation to obtain a minimum temporary bonding which is necessary in subsequent steps for completion of the bonding, such as the hot pressing step. Therefore, the progression of the bonding process is inhibited by such low initial adhesive strength. The fourth defect is that an adhesive solution cannot be applied by means of ordinary coating devices such as a flow coater or a curtain coater. Accordingly, the manufacture of plywoods cannot be performed on a continuous basis and it is impossible to save labor in the plywood manufacturing steps. The fifth defect is that heating should be effected at the bonding step. At the bonding step, heating is conducted to expel water as well as to promote condensation and curing in the adhesive resin. When the heat bonding step is omitted, no adhesive strength is manifested. The sixth defect is that the adhesive strength is greatly influenced by the water content in the woods to be bonded, and therefore, it is necessary to reduce the water content to about 10% by drying prior to the bonding step.

It is an object of the present invention to develop a wood adhesive which can overcome all of the foregoing defects of conventional formalin type thermosetting resins while retaining the merits of these resins and which can be manufactured at a low cost. It has now been found that a composition comprising a mixture of a copolymer of an α-olefin with an unsaturated carboxylic acid or a derivative thereof such as maleic anhydride or a salt of said copolymer such as an alkali- neutralized salt thereof and an hydroxide or oxide of a polyvalent metal provides an adhesive meeting the above requirements. The water-resistant adhesion obtained by an adhesive composition comprising such mixture is fit for formation of ordinary plywoods and ordinary water-resistant plywoods [plywoods of classes III and II defined according to Japanese Agricultural Standard (JAS)]; however, the adhesion does not reach the level required for highly water-resistant plywoods for outer decoration (plywoods of Class I defined according to JAS).

Therefore, the present invention also provides an adhesive composition applicable even for formation of highly water-resistant plywoods for outer decoration which can be used outdoors. More specifically, it has now been found that a mixture comprising a copolymer of an olefin with an unsaturated carboxylic acid or alkali-neutralized derivatives thereof, a polyvalent metal salt and a compound containing at least 2 epoxy groups in the molecule or such mixture further comprising an aqueous latex is an adhesive composition providing highly water-resistant adhesion.

The constituents of the compositions of this invention will now be described in further detail.

Suitable copolymers of olefins with unsaturated carboxylic acids are as follows:

1. Olefin copolymers with one or more carboxylic acids or derivatives thereof such as acrylic acid, methacrylic acid, crontonic acid, itaconic acid, monoesters of itaconic acid, fumaric acid, monoesters of fumaric acid, maleic acid and monoesters of maleic acid, citraconic acid, monoesters of citraconic acid, mesaconic acid and monoesters of mesaconic acid.

2. Olefin copolymers of monomers containing a functional group convertible to a carboxyl group upon hydrolysis or alkali saponification such as maleic anhydride, citraconic anhydride, itaconic anhydride, acrylamide, acrylonitrile, methacrylonitrile, acrylic acid esters, methacrylic acid esters, crotonic acid esters, maleic acid diesters and fumaric acid diesters.

Among the foregoing carboxyl group-containing polymers, olefin copolymers of one or more monomers selected from maleic anhydride, acrylamide, acrylonitrile and esters of acrylic and methacrylic acids are preferred. Especially preferred polymers are styrene-maleic anhydride copolymers and copolymers of an olefin with an unsaturated carboxylic acid or an anhydride thereof α-Olefin-maleic anhydride copolymers are most especially preferred among these especially preferred polymers. In the case of carboxyl group-containing polymers which are easily soluble in water, it is possible to employ water as a solvent, and in the case of carboxyl group-containing polymers which are slightly soluble in water or insoluble in water, an aqueous solution containing a basic substance can be used as a solvent.

Since the carboxyl group-containing polymer is generally used either dissolved in water or in water containing a basic substance, in order that sufficient end-use properties, especially sufficient water-resistant adhesion, can be obtained in the final adhesive composition, the carboxyl group content of the polymer has a lower limit. This lower limit varies depending on the chemical or physical structure of the polymer and the intended use, and it is impossible to accurately define the lower limit. It is, however, critical, that the units of the monomer containing a carboxyl group in the side chain occupy at least 10% by weight of the polymer, and it is preferred that the amount of the carboxyl group-containing monomer is 10 to 100% by weight, and preferably 30 to 85% by weight of the polymer.

In order to obtain an adhesive composition exhibiting sufficient adhesive strength, it is critical that the degree of polymerization of the carboxyl group-containing polymer should be at least about 100.

Basic substances which can be used for dissolving such carboxyl group-containing polymers in water, include, for example, alkali metal hydroxides, alkali metal carbonates, ammonium carbonate, ammonia, organic amines, alkali metal acetates and ammonium acetate. These basic substances can be used singly or in the form of an admixture of two or more of them.

Since an α-olefin-maleic anhydride copolymer is especially preferred among the above-mentioned polymers, this polymer will now be described in further detail. The α-olefin-maleic anhydride copolymers referred to herein include a copolymer of an α-olefin with maleic anhydride, a copolymer of an α-olefin with a monoester of maleic acid, a terpolymer of an α-olefin with maleic anhydride and a monoester or diester of maleic acid, a terpolymer of an α-olefin with a monoester of maleic acid and a diester or maleic acid, and reaction products between such a copolymer as mentioned above and an alcohol.

α-Olefins suitable for use in the formation of such copolymers include straight and branched α-olefins having 2 to 8 carbon atoms, preferably 2 to 6 carbon atoms. Specific examples of such α-olefins are ethylene, propylene, n-butene, isobutylene, n-pentene, isobutene, 2-methyl-1-butene, n-hexene, 2-methyl-1-pentene, 3-methyl-1-pentene, 4-methyl-1-pentene and 2-ethyl-1-butene. Isobutene is especially preferred among these α-olefins. The isobutene referred to herein also includes mixtures comprising mainly isobutene and 1-butene and/or 2-butene generally known in the art as "return B.B.", a mixture obtained after extraction of butadiene from the $C_4$ hydrocarbon mixture obtained by decomposition of naphtha. These α-olefins can be used singly or in the form of a admixture of two or more of them. The mono- or di-esters of maleic acid including mono- or di-alkyl esters of maleic acid, mono- or di-aryl esters of maleic acids, mono- or di-aralkyl esters of maleic acid, mono- or di-cycloesters of maleic acid and mono- or di-cycloalkyl esters of maleic acid. The number of carbon atoms in these alkyl, aryl, arylkyl, cyclo and cycloalkyl groups is within the range of from 1 to 8. The reaction product between such copolymer and an alcohol includes products obtained by esterifying such copolymer with an alcohol such as an aliphatic alcohol, an aromatic alcohol and a cyclic alcohol. The aliphatic, aromatic or cyclic residue of such alcohol contains from 1 to 8 carbon atoms.

Thus, the α-olefin- maleic anhydride copolymers which can be used in this invention and the reaction products between such copolymers and alcohols can be expressed by the following general formula:

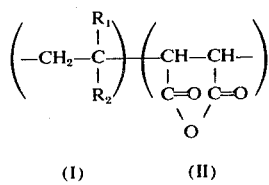

(I)     (II)

wherein $R_1$ and $R_2$ stand for a hydrogen atom or an alkyl group;

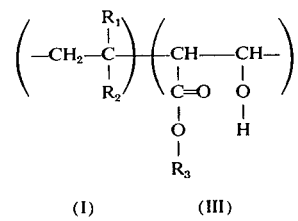

(I)     (III)

wherein $R_3$ stands for an alkyl group or other aliphatic residue or an aromatic or cyclic residue, and $R_1$ and $R_2$ are as defined above;

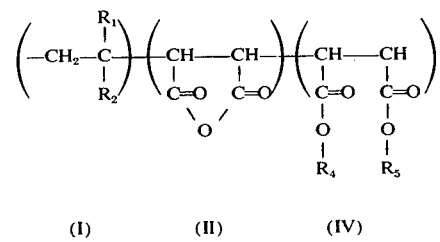

(I)     (II)     (IV)

wherein $R_4$ and $R_5$ stand for a hydrogen atom or an alkyl group or other aliphatic residue or an aromatic or cyclic residue, and $R_1$ and $R_2$ are as defined above, or

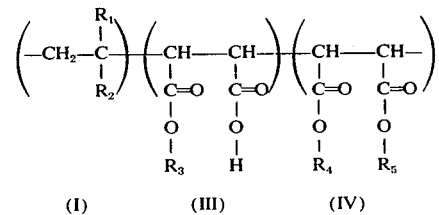

(I)     (III)     (IV)

wherein $R_1$, $R_2$, $R_3$, $R_4$ and $R_5$ are as defined above.

These copolymers can be prepared by effecting polymerization in the presence of a suitable free radical initiator by employing a suitable solvent. As a result of elemental analysis, it has been confirmed that in the case of the (I)–(II) copolymer, the mole ratio of (I) : (II) is about 1:1; in the case of the (I)–(III) copolymer, the mole ratio of (I): (III) is 1:1 or less; and that in the case of terpolymers comprising maleic acid alkyl ester units in addition to the maleic anhydride, the units (I) occupy one-half of the total units, the balance being units (II) and (IV) or units (III) and (IV), namely the mole ratio of (I): [(II) + (IV)] or (I): [(III) + (IV)] is about 1:1.

When the chain length of such copolymer is expressed in terms of the intrinsic viscosity [η] as measured at 30°C. with respect to a dimethylformamide solution, it is desired that the copolymer has an intrinsic viscosity [η] of 0.10 to 5, especially about 0.30 to about 2. When the intrinsic viscosity [η] is lower than 0.10, the adhesive strength becomes too low, and preparation of a copolymer having an intrinsic viscosity [η] exceeding 5 involves operational problems.

To the α-olefin-maleic anhydride copolymer to be used in this invention, another comonomer component copolymerizable therewith can be added. As such comonomer component, there can be mentioned, diolefins e.g. isoprene, 1,3-butadiene, 2-methyl butadiene, cyclopentadiene, 1,3-hexadiene, 4-methyl-1,3-pentadiene, 1,3-heptadiene, cyclooctadiene, vinyl esters such as vinyl acetate and alkyl vinyl ethers such as methylvinyl ether.

The polyvalent metal salt to be used in this invention includes salts of metals and transition metals of Groups II to VIII having a valency of at least 2, such as carbonates, sulfates, nitrates, acetates, phosphates, chlorides and silicates of such metals. As the metal having a valency of at least 2, there can be mentioned calcium, magnesium, zinc, barium, cadmium, lead, copper, aluminum, iron, nickel and cobalt, Among these polyvalent metal salts, sulfates, especially calcium sulfate, and carbonates, especially calcium carbonate, are preferred. These polyvalent metal salts can be used singly or in the form of an admixture of two or more of them. Use of these polyvalent metal salts results in improvement of the initial adhesive strength in the final adhesive composition, and neutral adhesives causing no alkali contamination can be obtained when these polyvalent metal salts are employed.

Such polyvalent metal salt is incorporated in the carboxyl group-containing polymer in an amount of less than 8000 % by weight, preferably, 50 to 3000 % by weight, are most preferably, 50 to 2000% by weight, based on the carboxyl group-containing polymer. When the polyvalent metal salt is added in an amount exceeding 8000% by weight, insufficient adhesion is obtained, and in many cases, the resulting adhesive compositions cannot be put into practical use. The composition composed of a mixture of the carboxyl group-containing polymer and such specific amount of the polyvalent metal salt is not a mere homogeneous dispersion but a stable suspension. Accordingly, water is readily diffused and penetrated into an article to be bonded and the initial adhesive strength can be greatly enhanced. This is one of characteristic features of the adhesive compositions of this invention.

Compounds containing at least 2 epoxy groups in the molecule, are preferably those which are partially soluble in water or water-soluble epoxy compounds and which do not cause a complete phase separation in the adhesive composition of this invention. The adhesive exhibits a most desirable water-resistant adhesion when the following epoxy compounds are used: glycidyl-etherified products of polyhydric alcohols such as glycerin diglycidyl ether, ethylene-glycol diglycidyl ether, polyethylene glycol diglycidyl ether, glycerin triglycidyl ether, propylene-glycol diglycidyl ether, polypropylene glycol diglycidyl ether, 3-methyl-1,3,5-pentaerythritol glycidyl ether and sorbitol glycidyl ether, and glycidyl-etherified products of compounds having at least 2 carboxyl groups in the molecule. As the compound containing at least 2 epoxy groups in the molecule, there can be employed the foregoing "carboxyl group-containing polymer" which is one of the constituents of the adhesive composition of this invention. In this invention, an epoxy compound which has a low solubility can be used, as long as it can be uniformly dispersed in the adhesive composition. For instance, epoxy resins composed of cyclohexene, a diglycidyl ether of bisphenol A, alicyclic epoxy resins, epoxy resins of the dimeric acid glycidyl ester type, nitrogen-containing epoxy resins, epoxy resins of the polybutadiene type, epoxy-alkyl ester epoxy resins, urethanated epoxy resins and metal-containing epoxy resins can be used in this invention.

In this invention, a catalyst such as triethylamine, triethanolamine, dimethylaniline, quinoline and zinc acetate can be used in order to promote the reaction between the carboxyl group-containing polymer and the epoxy compound.

The epoxy compound is incorporated in such an amount that the content of the epoxy group is less than 1000 mole %, preferably 5 to 400 mole %, based on the carboxyl group of the carboxyl group-containing polymer.

The aqueous latex to be used in this invention includes aqueous dispersions of natural and synthetic macromolecular substances. For instance, there can be employed dispersions of polymers composed of one unsaturated monomer selected from styrene, styrene derivatives, butadiene, acrylonitrile, chloroprene, isoprene, isobutene, acrylic acid esters, methacrylic acid esters, vinyl acetate, ethylene, vinyl chloride and vinylidene chloride, dispersions of copolymers of at least 2 copolymerizable unsaturated monomers selected from the the foregoing members, and natural rubber latices. More specifically, styrene-butadiene copolymer latices, styrene-isoprene copolymer latices, ethylene-vinyl acetate copolymer latices, polyvinyl acetate latices and the like are employed. Among these latices, styrene-butadiene copolymer latices are especially preferred.

In this invention, it is preferably to employ latices containing a carboxyl group or a carboxylic acid salt, a hydroxyl group or at least one functional group selected from amide, amino, sulfonic acid, isocyanate and epoxy groups and salts thereof. Especially good results are obtained by the use of latices, containing a carboxyl group or a carboxylic acid salt. By the term "latex containing a carboxyl group or a carboxylic acid salt" is meant a latex in which a carboxyl group or carboxylic acid salt is contained in at least one of the latex-constituting polymer or surfactant. The introduction of the carboxyl group can be accomplished by copolymerizing the foregoing unsaturated monomer with a copolymerizable, unsaturated organic acid such as acrylic acid, methacrylic acid, crotonic acid, itaconic acid, a semi-ester of itaconic acid, maleic acid, maleic anhydride and a semiester of maleic acid. Further, latices containing a carboxylic acid salt such as sodium, potassium calcium and ammonium salts, which are prepared by making a basic substance co-present with a latex of a polymer having an acid anhydride or carboxyl group. However, the polymer component of the latex to be used in this invention need not contain a carboxyl group or its salt, but it is possible to incorporate a carboxyl group or its salt in a surfactant or stabilizer to be used in the polymerization. As such surfactant, there can be mentioned, for instance, various soaps which are saponified products of fatty acids.

By the term "latex containing a hydroxyl group" is meant a latex in which a hydroxyl group is incorporated in at least one of the latex-constituting polymer or surfactant. Introduction of the hydroxyl group can be accomplished by copolymerizing the foregoing unsaturated monomer with a hydroxyl group-containing, copolymerizable unsaturated monomer such as allyl alcohol, 2-hydroxylethyl acrylate, 2-hydroxyethyl methacrylate, 2-hydroxypropyl acrylate, 2-hydroxypropyl methacrylate, mono-allyl ethers of polyhydric alcohols, N-methylolated acrylamid and N-methylolated methacrylamide. A latex of a hydroxyl group-containing polymer also can be prepared by other synthesis methods. For instance, such latex can be prepared by a method comprising adding a small amount of a basic substance to a latex of a homopolymer of vinyl acetate or a copolymer containing vinyl acetate as one component to partially saponify the vinyl acetate units. The latex-constituting polymer need not contain a hydroxyl group, but the hydroxyl group may be contained in a surfactant or stabilizer to be used in the polymerization. As such hydroxyl group-containing surfactant, there can be mentioned, for instance, polyoxyethylene alkyl ethers, polyoxethylene alkylphenol ethers, polyoxyethylene-oxypropylene block polymers and the like.

By the term "latex added with at least one functional group selected from amino, amide, sulfonic acid and epoxy groups and salts thereof" is meant a latex in which at least one functional group selected from the foregoing members is contained in at least one of the latex-constituting polymer or surfactant. Such latex can be prepared by copolymerizing the above-mentioned unsaturated monomer with an unsaturated monomer containing a functional group such as amino, amide, sulfonic acid and epoxy groups, for instance, glycidyl acrylate, glycidyl methacrylate, allyl glycidyl ether, dimethylaminoethyl methacrylate, vinyl pyridine, t-butylaminoethyl acrylate, t-butylaminoethyl methacrylate, acrylamide, methacrylamide and maleinamide. Latices containing a salt (for instance, an amine hydrochloride) formed by making a basic or acidic substance co-present with such functional group-containing latex can also be used in this invention. Such functional group need not be contained in the latex-constituting polymer, but in this case, the functional group could be contained in a surfactant or stabilizer to be used in the polymerization. As such functional group-containing surfactant there can be mentioned, for instance, polyacrylamide, alkylamine sulfates, sodium monobutylphenylphenol ether sulfate, sodium monobutyldiphenyl sulfate, sodium dibutylphenyl sulfate, sodium dibutyl-phenylphenol sulfate, sodium alkylaryl sulfonates, sodium dodecylbenzene sulfonate, sodium paraffin sulfate, sodium lauryl alcohol sulfate, sodium secondary alcohol (having 14 carbon atoms) sulfate, sodium octyl alcohol sulfate and the like. These surfactants contain an amide group, a sodium salt of sulfonic acid, an amine salt or the like. Among the foregoing latices, those added with a carboxyl group or a salt thereof are especially preferred. The content of the carboxyl group-containing organic acid in the latex is 0.1 to 30% by weight, and preferably 0.2 to 15% by weight, based on the total solids of the latex.

Latices prepared by employing a free radical initiator, a surfactant and a molecular weight regulator according to a customary method can be used in this invention. In addition to the above-mentioned surfactants, there can be employed anionic, non-ionic and cationic surfactants.

Aqueous latices formed by adding the above-mentioned water-soluble macromolecular substance as a protective colloid prior to, during or after the polymerization can also be used in this invention.

The first reason for the use of an aqueous latex in this invention is that film-forming characteristics of a film formed by mixing such aqueous latex with the carboxyl group-containing polymer are highly improved thereby enhancing adhesive strength in the dry state and water-resistant adhesive strength in wood articles bonded with use of the adhesive compositions of this invention. The second reason is that when a latex containing a carboxyl group or its salt, a hydroxyl group or such a functional group as amino, amide, sulfonic acid, isocyanate and epoxy groups is employed, such functional group reacts with the compound containing at least 2 epoxy groups in the molecule, which is one constituent of the adhesive composition, to form a water-insoluble, three-dimensional, cross-linked structure resulting in good water-resistance. The third reason is that by the use of such aqueous latex it is possible to highly increase the solids content within a range which will not cause operational difficulties, whereby the resulting adhesive composition can be readily coated on substrate surface and gives a high initial adhesive strength. The aqueous latex is incorporated in amounts, as determined by the resin solids, less than 6000% by weight, preferably 20 to 2000% by weight, based on the carboxyl group-containing polymer.

In the adhesive compositions of this invention, the viscosity gradually increases as the reaction between the carboxyl group-containing polymer and the epoxy compound proceeds. However, since the degree of increase in the viscosity can be greatly changed by controlling such factors as the carboxyl group concentration, the epoxy concentration and the pH value, a suitable composition giving a desired degree of increase in viscosity can be chosen depending on the desired pot life.

The degree of polymerization of the carboxyl group-containing polymer and the concentration of the adhesive composition comprising this polymer are closely related to the viscosity of the adhesive composition. In case an article to be bonded has a relatively small specific gravity and its structure, especially the surface structure, is porous, it is desired that by increasing the viscosity of the adhesive composition as much as possible by increasing the degree of polymerization and simultaneously elevating the concentration of the whole solids, reduction in the adhesive strength owing to excessive permeation of the adhesive composition is prevented.

When the adhesive composition of this invention is actually employed for bonding woods, it is possible to adjust the viscosity or the solids content by incorporating suitable amounts of ordinary fillers or extenders such as wood powder, wheat flour, soybean glue, urea, zeolite and the like.

The adhesive composition of this invention is employed in a dissolved state in water, and upon dissolution, the solids concentration can be adjusted to 10 to 70% by weight, preferably 20 to 60% by weight.

The order of addition of constituents of the adhesive composition except the epoxy compound is not considered critical, and they can be added in any order. The viscosity, or adhesive strength is hardly influenced by the order of addition of these constituents. However, in view of the pot life of the adhesive composition, it is desired that the epoxy compound be incorporated just before application of the adhesive composition.

The characteristic features of the so formed adhesive composition of this invention are as follows:

1. It is possible to increase the solids concentration to a very high level without increasing the viscosity to a level causing operational difficulties. Owing to this property as well as the fact that the composition is a suspension system, the resulting composition can exhibit a very high initial adhesive strength. The bonding ability at a temperature approximating room temperature is extremely low in adhesives now used in the art, because they are of the thermosetting type. Therefore, in the case of these conventional adhesives, primary clamping should be conducted for more than 40 minutes in the ordinary state and for more than 10 hours in winter, in order to obtain a sufficient temporary adhesive strength between veneer boards to insert them into a hot press at the bonding step in the manufacture of plywoods. For this reason, the plywood manufacturing process is quite lengthy. In contrast, the initial adhesive strength of the adhesive compositions of this invention is very high and it is hardly influenced by the ambient temperature. Therefore, the time required for primary clamping can be greatly shortened and it is usually sufficient to conduct clamping for less than 10 minutes, with the result that the manufacturing rate per unit time can be greatly increased.

2. Unless a volatile basic substance is used for dissolution of the carboxyl group-containing polymer or epichlorohydrin is added instead of the epoxy compound, the adhesive composition of this invention gives no odor or stimulant smell and working conditions are highly improved over the case where conventional thermosetting adhesives are employed. Further, at the hot pressing step, the adhesive composition of this invention releases no odor or stimulant gas.

3. The adhesive strength of the adhesive compositions of this invention is attributable to the ionizing or chelating reaction between the carboxyl group and the polyvalent metal salt and the esterifying reaction between the carboxyl group and the epoxy group, and since no by-product is formed in these reactions, the adhesive strength is hardly changed even with the lapse of time.

4. Since the viscosity of the adhesive composition of this invention can be freely changed as mentioned above and the adhesive composition takes the form of a solution of a polymer having a high degree of polymerization, it can be applied by means of such coating devices as a flow coater or a curtain coater.

5. Since the reactions mentioned above are allowed to advance even at room temperature, sufficient adhesive strength and highly water-resistant adhesion can be obtained under much milder conditions of bonding temperature and time than those employed in the case of conventional thermosetting resin adhesives, and therefore, even when only cold pressing is conducted, a water resistant, adhesion comparable to that obtained by conducting hot pressing can be attained.

6. The bonding ability of the adhesive compositions of this invention is hardly influenced by the water content of woods to be bonded. Therefore, woods need not be dried prior to the bonding operation.

7. The adhesive of the present invention exhibits a pH of from 6 to 9 and preferably 7 to 9. Thus, the adhesive is substantially neutral and therefore causes no alkali taint. This adhesive is preferably emphasized in the bonding of thin veneers.

When the adhesive of this invention is employed, it is unnecessary to change bonding procedures of conditions heretofore adopted. Since much better results can be expected by conducting the bonding operation under customary conditions, the adhesive compositions of this invention provide great economical advantages. Furthermore, when the adhesive compositions of this invention are employed, either the coating process or the bonding process can be greatly varied from the conventional one, so that the plywood manufacturing process can be practised in a continuous manner and the manufacturing rate can be greatly increased.

The adhesive compositions of this invention are especially suitable for formation of plywoods, particle boards, fittings, furniture, construction wood articles, sporting goods and other wood articles, and moreover, the adhesive compositions of this invention can be used for bonding articles other than wood articles, for instance, corrugated paper, ordinary paper, cloth, metal plates, china or porcelain, inorganic plates such as plates of mineral fibers, e.g., asbestos and rock wool, cement type inorganic plates such as asbestos slate plates, pulp-cement plates and concrete plates, plastic sheets such as polyvinyl chloride tiles and asphalt tiles, glass sheets and cemented wood wool. The adhesive compositions of this invention are applicable not only for bonding an article such as mentioned above to a similar or identical article but also for bonding two or more different articles together. Moreover, the compositions of this invention are applicable for clay coating of paper and are usable as a coating agent for use in painting.

This invention will now be described in more detail in the following examples. This invention is not, however, to be construed as being limited to the embodiments illustrated in these examples.

All percentages and parts are by weight unless otherwise specified.

EXAMPLE 1

25 g of an isobutylene-maleic anhydride copolymer (mole ratio = 1:1) having a degree of polymerization of 1100 was mixed with 63.2 g of water and 11.8 g of 28% aqueous ammonia, and the mixture was heated at 80°C. to form a solution.

Separately, a latex was prepared by emulsion polymerization of styrene, butadiene and acrylic acid as unsaturated monomers. The water content in the latex was 51% and the total solids content was 49%. The latex-constituting polymer contained 44% of styrene, 53% of butadiene and 3% of acrylic acid. Sodium dodecylbenzene sulfonate was used as a surfactant in an amount of 5 parts by weight per 100 parts by weight of the total monomers.

200 g. of the above latex, 125 g. of gypsum (calcium sulfate) and 75 g. of water were added successively to the above aqueous solution of the isobutylene-maleic anhydride copolymer and the mixture was agitated to form a white suspension. Then, 10 g. of glycerin diglycidyl ether (WPE = 145.6) as a water-soluble epoxy compound was added to the solution to obtain an adhesive composition (pH 8.1). WPE means Weight Per Epoxy Equivalent.

After about 60 minutes had elapsed after addition of the epoxy compound, this adhesive composition was coated on red lauan veneers in an amount of 30 g./900 cm$^2$ and three veneers, each having a thickness of 1 mm., were piled to form a plywood. The plywood was allowed to stand still in the piled state for 20 minutes and clamping (cold pressing) was performed under application of a pressure of 10 kg/cm$^2$ for 20 minutes, following which hot pressing was carried out under application of a pressure of 10 kg/cm² at 120°C. for 1 minute. The obtained adhesive strength was determined according to the method specified in JAS. As a result, it was found that the adhesive strength according to the dry bonding test was 26.5 kg/cm², the adhesive strength according to the hot and cold soaking test was 20.6 kg/cm² and the adhesive strength according to the cyclic boiling test was 16.2 kg/cm².

EXAMPLE 2

The procedures employed in Example 1 were repeated under the same conditions except that a latex composed of a polymer containing 49.5% of styrene, 48% of isoprene and 2.5% of acrylic acid, which was prepared in the same manner as in Example 1 by employing isoprene instead of butadiene, was employed. The adhesive strength according to the dry bonding test was 24.3 kg/cm², the adhesive strength according to the hot and cold soaking test was 18.1 kg/cm² and the adhesive strength according to the cyclic boiling test was 13.4 kg/cm².

EXAMPLE 3

25 g. of an isobutylene-maleic anhydride copolymer (mole ratio = 1:1) was mixed with 55.3 g. of water and 19.7 g. of 28% aqueous ammonia, and the mixture was heated at 80°C. to form a solution. To the solution were successively added 67 g. of an aqueous emulsion of an ethylene-vinyl acetate copolymer (PANFLEX, produced by Kuraray Co., Ltd., solids concentration= 56.1%), 87.5 g. of calcium carbonate and 45.5 g. of water. Then, the mixture was agitated to obtain a white suspension. Then, 8 g. of a glycidyl-etherified product of sorbitol (WPE= 165.8) was added to the solution to obtain an adhesive composition (pH 6.8). The adhesive strength was determined with respect to the so obtained adhesive composition in the same manner as described in Example 1. As a result it was found that the adhesive strength according to the dry bonding test was 10.1 kg/cm², the strength according to the hot and cold soaking test was 9.2 kg/cm² and the adhesive strength according to the cyclic boiling test was 7.4 kg/cm².

EXAMPLE 4

25 g. of an isobutylene-maleic anhydride copolymer (mole ratio = 1:1) having a degree of polymerization of 1100 was added to an aqueous solution of sodium hydroxide consisting of 64.6 g. of water and 10.4 g. of sodium hydroxide, and the mixture was heated at 85°C. to form a solution. Then, 200 g. of the same latex as used in Example 1, 100 g. of gypsum (calcium sulfate) and 100 g. of water were added successively to the so formed solution to form a white suspension. Then, 10 g. of a glycidyl-etherified product of 3-methyl-1,3,5-pentane triol (WPE=142.5) was added to the solution to obtain an adhesive composition (pH 7.5). The adhesive strength was measured with respect to the so obtained adhesive composition in the same manner as described in Example 1. As a result, it was found that the adhesive strength according to the dry bonding test was 23.1 kg/cm², the adhesive strength according to the hot and cold soaking test was 16.3 kg/cm² and the adhesive strength according to the cyclic boiling test was 11.5 kg/cm².

EXAMPLE 5

50 g. of an isobutylene-maleic anhydride copolymer (mole ratio = 1:1) was mixed with 24 g. of 28% aqueous ammonia and 86 g. of water, and the mixture was heated at 80°C. to form a solution. To the solution were added 150 g. of the same carboxyl group-modified styrene-butadiene copolymer as used in Example 1 and 100 g. of gypsum (calcium sulfate), and the mixture was agitated to form a white suspension. Then, 8 g. of a di-glycidyl ether of glycerin (WPE=145.6) was added to the solution to obtain an adhesive composition.

The so formed adhesive composition (pH 6.9) was coated on a substrate plate composed of plywood having a thickness of 3 mm. in an amount of 10 g/900 cm² and a fitting plate having a water content of 60% and being composed of a zelkova plate of a thickness of 0.3 mm. was piled on the adhesive-applied substrate plate. Immediately, the assembly was subjected to cold pressing under application of a pressure of 10 kg/cm² for 20 minutes, and hot pressing was then carried out under application of a pressure of 10 kg/cm² at 120°C. for 1 minute. The resulting adhesive strength was tested according to the hot and cold soaking test specified in JAS. As a result, there was observed no peeling and the sample passed the test.

EXAMPLE 6

The same composition as prepared in Example 5 was coated on a calcium silicate plate, a pulp cement plate and an asbestos plate, each having a thickness of 4 mm., in an amount of 10 g/900 cm², respectively, and a fitting plate having a thickness of 0.3 mm. and being composed of cherry wood having a water content of 55% was piled on each of the adhesive-applied plates and immediately, hot pressing was conducted under application of a pressure of 10 kg/cm² at 120°C. for 1 minute. When the adhesive strength was tested according to the hot and cold soaking test, it was found that each sample passed the test.

EXAMPLE 7

25 g. of an isobutylene-maleic anhydride copolymer (mole ratio=1:1) having a degree of polymerization of 300 was added to an aqueous solution of sodium hydroxide consisting of 86 g. of water and 7.8 g of sodium hydroxide, and the mixture was heated at 80°C. to form a solution. Then, 67 g. of gypsum (calcium sulfate) were added to the so formed solution to form a white suspension. Then, 5.5 g. of a di-glycidyl ether of glycerin (WPE=145.6) was added to the solution to obtain an adhesive composition.

The so formed adhesive composition (pH 7.2) was coated on a substrate plate composed of a plywood having a thickness of 3 mm. in an amount of 10 g./900 cm² and a fitting plate having a water content of 60% and being composed of a zelkova plate of a thickness of 0.3 mm. was piled on the adhesive-applied substrate plate. Immediately, the assembly was subjected to cold pressing under application of a pressure of 10 Kg/cm² for 20 minutes, and hot pressing was then carried out under application of a pressure of 10 Kg/cm² at 120°C. for 90 seconds. The resulting adhesive strength was tested according to the hot and cold soaking test specified in JAS. As a result, there was observed no peeling and the sample passed the test.

EXAMPLE 8

25 g. of an isobutylene-maleic anhydride copolymer (mole ratio = 1:1) having a degree of polymerization of 600 was mixed with 60 g. of water and 11.8 g. of 28% aqueous ammonia, and the mixture was heated at 85°C. to form a solution. Then, 45 g. of calcium carbonate, 33 g. of wheat flour and 25 g. of water were added to the so formed solution to form a white suspension. Then, 6 g. of a di-glycidyl ether of glycerin (WPE=145.6) was added to the solution to obtain an adhesive composition (pH 7.4). A fitting plate was adhered to 3 mm. plywood in the same manner as described in Example 7. The resulting adhesive strength was tested according to the hot and cold soaking test specified in JAS. As a result, there was observed no peeling and the sample passed the test.

EXAMPLE 9

30 g. of an isobutylene-maleic anhydride copolymer (mole ratio=1:1) having a degree of polymerization of 300 was mixed with 10 g. of sodium hydroxide and 225 g. of water, and the mixture was heated at 80°C. to form a solution. Then, 50 g. of calcium carbonate and 140 g. of the same latex as used in Example 1, and further 15 g. of di-glycidyl ether of glycerin was added with stirring to the so formed solution to obtain an adhesive composition (pH 8.5). The viscosity of this composition was about 500 centipoise at 25°C. The so formed adhesive composition (280 g.) was sprayed onto lauan chips (1000 g.) and thereafter, the chips were placed into a mold (300 mm. width × 300 mm. length × 15 mm. height) and then clamping (cold pressing) was performed under application of a pressure of 10 Kg/cm² for 10 minutes, following which hot pressing was carried out under application of a pressure of 20 Kg/cm² at 150°C. for 15 minutes to obtain a single layer particle board. This particle board was tested according to JIS A 5908 (JIS means Japan Industrial Standard) and the results are shown in Table I.

TABLE I

| thickness | density | water content | bonding strength | nail holding |
| --- | --- | --- | --- | --- |
| 15.03 mm | 0.68 | 6.7% | 201 Kg/cm² | 46 Kg |

EXAMPLE 10

20 g. of an isobutylene-maleic anhydride copolymer (mole ratio=1:1) was mixed with 220 g. of water and 12 g. of 28% aqueous ammonia, and the mixture was heated at 80°C. to form a solution. Then, 50 g. of calcium sulfate and 160 g. of the same latex as used in Example 2, and further 15 g. of di-glycidyl ether of polyethylene glycol was added with stirring to the so formed solution to obtain an adhesive composition (pH 7.8). The viscosity of this composition was about 400 poise at 25°C. Particle board was prepared from this adhesive composition in the same manner as described in Example 9 and the results are shown in Table II.

TABLE II

| thickness | density | water content | bonding strength | nail holding |
| --- | --- | --- | --- | --- |
| 15.05 mm. | 0.67 | 6.2% | 178 Kg/cm² | 41 Kg. |

What is claimed is:

1. An adhesive composition comprising: (A) an aqueous solution of a member selected from the group consisting of (1) a copolymer of an α-olefin having from 2 to 8 carbon atoms and at least one comonomer selected from the group of an unsaturated carboxylic acid, an ester of an unsaturated carboxylic acid and a compound having a functional group which is convertible to a carboxyl group by hydrolysis or alkali saponification, said comonomer being present in an amount comprising from 30 to 85% by weight of the copolymer, the degree of polymerization being at least 100, and (2) a water soluble salt of said copolymer; (B) a salt selected from the group consisting of the carbonate, sulfate, nitrate, acetate, phosphate, chloride and silicate salts of calcium, magnesium, zinc, barium, cadmium, lead, copper, aluminum, iron, nickel and cobalt, in an amount less than 8000% by weight of the copolymer; and (C) a compound having at least two epoxy groups per molecule in an amount less than 1000 mole % based on the carboxyl group of the copolymer.

2. An adhesive composition according to claim 1 in which the salt is present in an amount of from 50 to 3000% by weight of the polymer.

3. An adhesive composition according to claim 1 in which the epoxy compound is present in an amount of from 5 to 400 mole % based on the carboxyl group of the copolymer.

4. An adhesive composition comprising: (A) an aqueous solution of a member selected from the group consisting of (1) a copolymer of an α-olefin having from 2 to 8 carbon atoms and maleic anhydride in an amount comprising from 30 to 85% by weight of the copolymer, the degree of polymerization being at least 100, and (2) a water soluble salt of said copolymer; (B) a salt selected from the group consisting of the carbonate, sulfate, nitrate, acetate, phosphate, chloride and silicate salts of calcium, magnesium, zinc, barium, cadmium, lead, copper, aluminum, iron, nickel and cobalt, in an amount less than 800% by weight of the copolymer; and (C) a compound having at least two epoxy groups per molecule in an amount less than 1000 mole % based on the carboxyl group of the copolymer.

5. An adhesive composition according to claim 4 in which the salt is present in an amount of from 50 to 3000% by weight of the polymer.

6. An adhesive composition according to claim 4 in which the epoxy compound is present in an amount of from 5 to 400 mole % based on the carboxyl group of the copolymer.

7. An adhesive composition comprising: (A) an aqueous solution of a member selected from the group consisting of (1) a copolymer of isobutylene and maleic anhydrode in an amount comprising from 30 to 85% by weight of the copolymer, the degree of polymerization being at least 100, and (2) a water soluble salt of said copolymer; (B) a salt selected from the group consisting of the carbonate, sulfate, nitrate, acetate, phosphate, chloride and silicate salts of calcium, magnesium, zinc, barium, cadmium, lead, copper, aluminum, iron, nickel and cobalt, in an amount less than 8000% by weight of the copolymer; and (C) a compound having at least two epoxy groups per molecule in an amount less than 1000 mole % based on the carboxyl group of the copolymer.

8. An adhesive composition according to claim 7 wherein the salt is selected from the group consisting of calcium sulfate and calcium carbonate.

9. An adhesive composition according to claim 7 in which the salt is present in an amount of from 50 to 3000% by weight of the copolymer.

10. An adhesive composition according to claim 7 in which the epoxy compound is present in an amount of from 5 to 400 mole % based on the carboxyl group of the copolymer.

11. An adhesive composition comprising: (A) an aqueous solution of a member selected from the group consisting of (1) a copolymer of an α-olefin having from 2 to 8 carbon atoms and maleic anhydride in an amount comprising from 30 to 85% by weight of the copolymer, the degree of polymerization being at least 100, and (2) a water soluble salt of said copolymer; (B) a salt selected from the group consisting of (1) calcium sulfate and (2) calcium carbonate in an amount less than 8000% by weight of the copolymer; and (C) a compound having at least two epoxy groups per molecule in an amount less than 1000 mole % based on the carboxyl group of the copolymer.

12. An adhesive composition according to claim 11 in which the salt is present in an amount of from 50 to 3000% by weight of the polymer.

13. An adhesive composition according to claim 11 in which the epoxy compound is present in an amount of from 5 to 400 mole % based on the carboxyl group of the copolymer.

14. An adhesive composition according to claim 1 which further comprises an aqueous emulsion or latex.

15. An adhesive composition according to claim 1 which further comprises a styrene-butadiene copolymer latex.

16. An adhesive composition according to claim 1 which further comprises a styrene-isoprene copolymer latex.

17. An adhesive composition according to claim 4 which further comprises an aqueous emulsion or latex.

18. An adhesive composition according to claim 4 which further comprises a styrene-butadiene copolymer latex.

19. An adhesive composition according to claim 4 which further comprises a styrene-isoprene copolymer latex.

20. An adhesive composition according to claim 7 which further comprises an aqueous emulsion or latex.

21. An adhesive composition according to claim 7 which further comprises a styrene-butadiene copolymer latex.

22. An adhesive composition according to claim 7 which further comprises a styrene-isoprene copolymer latex.

23. An adhesive composition according to claim 1, wherein pH of the adhesive composition is from 6 to 9.

24. An adhesive composition according to claim 14, wherein pH of the adhesive composition is from 6 to 9.

25. An adhesive composition according to claim 11 which further comprises an aqueous emulsion or latex.

26. An adhesive composition according to claim 11 which further comprises a styrene-butadiene copolymer latex.

27. An adhesive composition according to claim 11 which further comprises a styrene-isoprene copolymer latex.

* * * * *